United States Patent Office 3,681,035
Patented Aug. 1, 1972

3,681,035
PROCESS FOR PREPARING ALPHA AMMONIUM URANOUS PENTAFLUORIDE
Murray Selman, Pittsburgh, Pa., and Christian A. Wamser, Berkeley Heights, and John E. Wilkalis, Morris Plains, N.J., assignors to Allied Chemical Corporation, New York, N.Y.
No Drawing. Continuation-in-part of application Ser. No. 824,357, Apr. 29, 1969, which is a continuation of application Ser. No. 683,022, Nov. 14, 1967. This application Oct. 1, 1969, Ser. No. 862,935
Int. Cl. C01g 43/00, 43/06
U.S. Cl. 23—346        3 Claims

ABSTRACT OF THE DISCLOSURE

Process for preparing $NH_4UF_5$ in alpha crystalline form by adding to an aqueous acidic solution of a uranyl salt containing cupric ions, chloride ions and ammonium ions, hydrogen fluoride and hydroxylamine, the hydroxylamine being added in amounts and time of addition so as to maintain a concentration of at least about 0.07 mol of hydroxylamine per liter of solution until the major portion of the uranium in the uranyl salt has been converted to $NH_4UF_5$.

PROCESS FOR PREPARING ALPHA AMMONIUM URANOUS PENTAFLUORIDE

This application is a continuation-in-part of our copending application Ser. No. 824,357, filed Apr. 29, 1969, now abandoned, which in turn is a continuation of our application Ser. No. 683,022, filed Nov. 14, 1967, now abandoned.

This invention relates to a process for preparing ammonium uranous pentafluoride in its alpha crystalline form and more particularly to such a process wherein formation of other uranium- and fluorine-containing compounds, including ammonium uranous pentafluoride in beta form, are substantially inhibited.

Ammonium uranous pentafluoride, $NH_4UF_5$, sometimes styled $NH_4F \cdot UF_4$, has been known for many years and is useful as an intermediate in the successive production of uranium tetrafluoride ($UF_4$), uranium hexafluoride ($UF_6$), and uranium metal, which products are useful in the production of fissionable uranium metal and in the production of nuclear fuels (e.g. $UO_2$) for the generation of electric power.

Ammonium uranous pentafluoride has been prepared in the past by reacting ammonium fluoride with uranium tetrafluoride under anhydrous conditions. This process is not commercially feasible as it requires the use of pure reagents, and requires the substantial exclusion of water to produce the final anhydrous product.

Ammonium uranous pentafluoride is a green crystalline solid, and is known to exist in two distinct crystalline forms, designated respectively, the alpha and beta forms, which are distinguishable by their X-ray diffraction patterns (Inorganic Chemistry 2, 799–803 [1963]).

In the conversion of ammonium uranous pentafluoride to uranium hexafluoride according to known procedures, the $NH_4UF_5$ is first heated to its decomposition temperature, thus producing uranium tetrafluoride and ammonium fluoride. Virtually all the impurities present in the $NH_4UF_5$ are carried over into the $UF_4$. The solid uranium tetrafluoride is then recovered and is fluorinated, as in a fluidized bed, to produce gaseous uranium hexafluoride.

The uranium tetrafluoride used in the fluid bed fluorination to form $UF_6$, must be relatively free of impurities, especially of sodium and/or potassium compounds, since these impurities become fluorinated to solid sodium and potassium fluorides which remain in the fluid bed and build up in concentration, eventually causing fusing and consequent inactivation of the fluid bed. Accordingly, for fluid bed fluorination, the $UF_4$ should preferably contain no more than about 0.25% (2500 parts per million) total sodium and potassium impurities. This criterion imposes corresponding purity requirements on the ammonium uranous pentafluoride from which $UF_4$ for fluid bed fluorination is obtained, and such $NH_4UF_5$ products should likewise contain no more than about 2500 parts per million (0.25%), preferably below about 2,000 parts per million (0.20%) of combined sodium and potassium, based on the uranium as metal.

To produce $UF_4$ products of suitably low sodium and potassium contents for fluid bed purposes, therefore, it has heretofore been necessary to process ore concentrates of relatively low sodium and potassium contents to achieve the necessary low Na and K values in the resulting $UF_4$, for example, to start with ore concentrates containing no more than about 3,000 parts per million (0.30%) combined sodium and potassium, based on the uranium in the ore.

Other metallic impurities are also undesirable in $UF_4$ and $UF_6$ used for various purposes so that purchasers have set specification limits for a number of impurities in addition to sodium and potassium. Among these are vanadium and molybdenum which are troublesome because, in the fluorination of $UF_4$ to $UF_6$, these elements convert to their respective volatile fluorides, then tend to "plate out" on equipment during distillation of the $UF_6$.

We have discovered in the course of our studies that ammonium uranous pentafluoride produced in the alpha crystalline form consistently contains lower proportions of impurities than does the beta crystalline material prepared from the same uranium ore and is especially low in sodium and potassium contamination. The reason for this phenomenon is not clearly understood but it is theorized that the alpha crystalline lattice tolerates fewer hetero atoms than does the beta. It is therefore highly desirable, in producing ammonium uranous pentafluoride for the production of $UF_4$ for eventual conversion to uranium hexafluoride by the fluid bed fluorination of $UF_4$, to produce ammonium uranous pentafluoride in the alpha crystalline form.

An object of the present invention is to produce crystalline ammonium uranous pentafluoride predominantly in the alpha crystalline form.

Another object of the invention is to produce crystalline ammonium uranous pentafluoride of high purity, and especially low in contamination with metallic impurities, particularly sodium and/or potassium.

A still further object of the invention is to produce alpha ammonium uranous pentafluoride of high purity from uranium ore concentrates contaminated with metallic impurities including sodium, and from uranyl salts produced therefrom.

A still further object of the invention is to produce alpha ammonium uranous pentafluoride containing less than about 2500 parts of sodium and/or potassium per million parts of uranium.

A still further object, is to produce crystalline ammonium uranous pentafluoride predominantly in the alpha crystalline form and substantially uncontaminated with other uranium-fluorine-containing compounds, particularly $UF_4$ hydrates, $NH_3OH \cdot UF_5$ and ammonium fluoride/uranium tetrafluoride complexes other than $NH_4F \cdot UF_4$.

These and other objects are accomplished according to our invention by adding hyrogen fluoride and hydroxylamine to an aqueous acidic solution of a uranyl salt containing ammonium ions, chloride ions and cupric ions, the hydroxylamine being added in amounts totaling at least about one mol of hydroxylamine per mol of uranium in the solution, and the additions of hydroxylamine being regulated in amounts and times of addition so as to maintain its concentration in said aqueous acidic solution at at least about 0.07 mol per liter of solution until conversion of at least about 75% of the uranium in the solution to $NH_4UF_5$ has taken place, and recovering the resulting predominantly alpha crystalline ammonium uranous pentafluoride.

In carrying out the process according to our invention, the starting uranyl salt, for example $UO_2F_2$, may be obtained from uranium ore concentrates by treatment of the concentrate with acids, such as hydrofluoric, hydrochloric or sulfuric acid to produce the corresponding uranyl fluoride, chloride or sulfate. We prefer to use the fluoride, as this compound is more economical in total acid consumption and furnishes two of the five fluorine atoms required in the ammonium uranous pentafluoride end product. Accordingly, the discussion that follows will be directed to the use of uranyl fluoride as exemplary.

The process of our invention can be illustrated by the following equation:

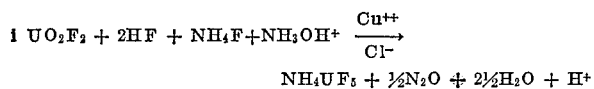

Instead of $UO_2F_2$ as the uranyl salt, the sulfate, $UO_2SO_4$, the chloride $UO_2Cl_2$, or the acetate, $$UO_2(C_2H_3O_2)_2$$

may be used with appropriate increase in the proportion of HF used, to provide the required five fluorine atoms for the $NH_4UF_5$ end product.

Aqueous solutions of all of the uranyl salts are acidic in the sense that they exhibit acidic pH values, whether or not an excess of acid has been used in their preparation. Thus acidic pH values are exhibited by aqueous uranyl salt solutions which (1) contain an excess of acid, or (2) which are stoichiometrically neutral, i.e. contain no excess acid or (3) which contain alkaline contaminants. When the term "acidic solution" is used herein, it should be construed as including all such solutions having acidic pH values.

Table A below illustrates pH vaues exhibited by typical uranyl salt solutions usable in our process.

salt solution containing principally $UO_2F_2$ together with virtually all the impurities originally present in the ore concentrate, and with the remaining excess of HF, if any, also dissolved in the solution.

Solution takes place according to the following equations:

(2) $\quad UO_3 + 2HF \rightarrow UO_2F_2 + H_2O$ (3) $\quad UO_3 + H_2SO_4 \rightarrow UO_2SO_4 + H_2O$ (4) $\quad UO_3 + 2HCl \rightarrow UO_2Cl_2 + H_2O$ To the uranyl fluoride or other uranyl salt solution thus produced, is added hydrogen fluoride in an amount at least sufficient to provide the 5 mols of fluorine per mol of uranium required in the end product. There are also added a catalytic quantity of a soluble copper salt, to provide $Cu^{++}$ ions in an amount of at least about 0.3 mol of copper ions per liter of solution, and a source of chloride ions, $Cl^-$, as stabilizer for the copper ions, the chloride ions being added in an amount sufficient to provide a $Cl^-$ to $Cu^{++}$ molar ratio of at least about 4. A soluble ammonium salt is included, to provide ammonium ions in the proportions of at least about 1 mol $NH_4^+$ per mol of uranium in the solution. The amount of ammonium ion is not unduly critical and usually will be added in amounts between about 1 mol and about 1.5 mols per mol of uranium.

The dissolved ore solution, containing $UO_2F_2$ together with copper, chloride and ammonium ions, is heated to at least about 85° C., preferably to between about 95° C. and about 105° C., and is maintained within this temperature range while hydroxylamine is added thereto either as a single charge, or incrementally at such a rate as to maintain the hydroxylamine concentration at a value not substantially lower than about 0.07 mol of hydroxylamine per liter of solution during the major course of the ensuing reaction, i.e. until the uranium in the solution has been at least about 75% converted to ammonium uranous pentaflloride according to equation (1) above.

The reaction proceeds rapidly, and substantially complete precipitation of the $NH_4UF_5$ usually is effected in not more than about 30 minutes, often in periods as short as about 5–10 minutes.

The ammonium uranous pentafluoride precipitates as

TABLE A pH Values of Typical Aqueous Uranyl Salt Solutions

| Salt | With excess acid | Stoichiometrically neutral 0.10 mol salt per liter at 25° C. | 0.50 mol salt per liter at 25° C. | 0.10 molar aqueous solution containing 30,000 parts Na per million parts U | 0.50 molar aqueous solution containing 30,000 parts Na per million parts U |
|---|---|---|---|---|---|
| Uranyl chloride $UO_2Cl_2$ | <1 | 2.62 | 1.88 | 3.25 | 2.56 |
| Uranyl sulfate $UO_2SO_4$ | <1 | 2.73 | 1.97 | 3.42 | 2.75 |
| Uranyl fluoride $UO_2F_2$ | <1 | 3.11 | 2.30 | 3.70 | 3.08 |
| Uranyl acetate $UO_2(OOCCH_3)_2$ | <1 | 4.05 | 3.52 | 4.90 | 4.38 |

In the process according to our invention, the uranyl salt used as starting material can conveniently be obtained from uranium ore concentrates, for example from ore concentrates consisting primarily of uranium oxides and/ or their hydrates. These concentrates almost invariably contain small to substantial amounts of associated impurities which vary according to the source of the ore and the process used in its concentration. Impurities usually present are sodium and/or potassium, often associated with other impurities such as vanadium, molybdenum, iron and copper compounds. In preparing the uranyl salt, the ore concentrate is slurried with water, to which is added a mineral or organic acid, preferably hydrogen fluoride. In preparation of uranyl fluoride, hydrogen fluoride is added, either as gaseous HF or in the form of an aqueous hydrofluoric acid solution to provide at least about 2 mols of HF per mol of uranium in the ore. An excess of HF may be added if desired. The resulting mixture is agitated until the ore concentrate appears to be substantially completely dissolved, thus forming a uranyl a green crystalline salt which X-ray diffraction analysis indicates to be preponderantly the alpha crystalline form as shown by the presence of strong diffraction peaks at the d values 8.4, 3.49, 3.03 and 2.13 angstrom units characteristic of the alpha $NH_4UF_5$ (see Inorganic Chemistry 2, 799–803 [1963] p. 802). The resulting $NH_4UF_5$ salt usually shows only very weak diffraction peaks, or the complete absence of such peaks at the d values of 6.97, 4.01, 3.48, 3.24 and 2.02 angstrom units characteristic of the beta $NH_4UF_5$. The ammonium uranous pentafluoride of our invention also is free of contamination with $NH_3OHUF_5$ when excesses of hydroxylamine are avoided, as indicated by complete absences of X-ray diffraction peaks at d values of 7.68, 3.19, 2.42, 2.22, 2.11, 2.07 and 2.00 angstrom units characteristic of $$NH_3OHUF_5$$

The overall purity of the $NH_4UF_5$ of our invention is extremely high, usually about 99.5% or higher, as indicated by spectrographic analysis, and furthermore, it is extremely low in harmful impurities, especially sodium and potassium.

The ore concentrates suitable for conversion to ammonium uranous pentafluoride according to our invention include any uranium-oxide-containing ore concentrates, especially those containing principally $UO_3$ or its hydrates, with some $U_3O_8$ or $UO_2$, the oxides usually ranging in concentration from about 70% to 95% or higher, associated with smaller amounts of impurities such as Na, K, V, Mo, Fe and Cu compounds. Proportions of impurities in various ore concentrates vary widely, depending on the initial character and contamination of the ore, and on the processes by which it has been beneficiated or concentrated. As pointed out above, the most troublesome impurities from the point of view of subsequent processing are sodium and potassium. These alkali metal compounds may be present in the concentrate in proportions as low as 0.2% where special processing steps have been carried out, and as high as 3% or higher where less drastic processing has been resorted to, or where ores of higher concentrations of impurities have been employed. Upon conversion of the ore concentrate to uranyl salt, virtually all of these impurities are dissolved and find their way into the uranyl salt solution.

As pointed out above, ore concentrates containing percentages of sodium and/or potassium contamination, in proportions above about .3% (i.e. 3 parts per 100 parts U) have ben considered unsatisfactory in the past, for the production of fluid bed $UF_4$. On the other hand, when proceeding by the process of our invention, the more highly contaminated ore concentrates are readily usable, including those containing up to about 3% or higher, of combined sodium and/or potassium contamination, for the production of $NH_4UF_5$ pure enough to yield $UF_4$ of purity sufficiently high for fluid bed conversion to $UF_6$ without troublesome fusing of the bed.

The hydroxylamine used in our invention may be added as such, or on any convenient hydroxylamine-yielding compound.

Thus, in place of hydroxylamine, we may use hydroxylamine salts or mixtures thereof such as hydroxylamine sulfate $(NH_3OH)_2SO_4$, hydroxylamine bisulfate $$NH_3OH \cdot HSO_4$$

hydroxylamine hydrochloride, $NH_3OHCl$, etc.

Also suitable as hydroxylamine-yielding compounds are the oximes, i.e. compounds of the structure

wherein each of $R^1$ and $R^2$ represents an alkyl group of 1–6 carbon atoms or both $R^1$ and $R^2$ together represent a cyclohexyl group such as acetoxime $(CH_3)_2C=NOH$, cyclohexanone oxime, methyl isobutyl oxime, which hydrolyze rapidly in aqueous acid solution to hydroxylamine and the corresponding ketone

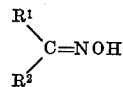

The function of the hydroxylamine in our process is two-fold. First, it acts as a reducing agent to convert $Cu^{++}$ to $Cu^+$ which then acts to reduce the hexavalent uranium in the ore concentrates to tetravalent state, regenerating $Cu^{++}$, according to the equation (5) $2Cu^{++} + NH_3OH^+ \rightarrow 2Cu^+$
$+ \frac{1}{2}N_2O + \frac{1}{2}H_2O + 3H^+$ Second, we have found, surprisingly, that the relative concentration of hydroxylamine in the reaction medium is critically determinative of the crystal structure of the crystalline $NH_4UF_5$ precipitated. When the concentration of the hydroxylamine is above about 0.07 mol per liter of solution, alpha ammonium uranous pentafluoride is formed; when the concentration of hydroxylamine drops below about 0.07 mol per liter of solution, beta ammonium uranous pentafluoride precipitates. Accordingly, to insure the production of predominantly alpha ammonium uranous pentafluoride, we maintain the hydroxylamine concentration in the reaction mixture above the critical limit until the major portion of the uranium in the uranyl salt has been converted to $NH_4UF_5$. This can be accomplished if desired, by adding a large excess of hydroxylamine to the reaction mass at the start of the reaction, such excess being sufficient to insure the requisite concentration of hydroxylamine throughout the reaction period even after decomposition of part of the hydroxylamine which tends to occur in the reaction medium. In such process it is necessary to provide at least about 2 mols of hydroxylamine per mol of uranium to insure provision of the single mol necessary for the reaction, after compensating for the hydroxylamine lost by decomposition. This procedure, however, is disadvantageous in that it is wasteful of hydroxylamine, and moreover, tends to promote formation of substantial proportions of $NH_3OHUF_5$ in the precipitate as by-product.

We have found, however, that we can maintain the required hydroxylamine concentration, with a spectacular saving in hydroxylamine and with substantially complete suppression not only of beta $NH_4UF_5$ formation, but also suppression of $NH_3OHUF_5$ formation, by adding a smaller initial charge of hydroxylamine, followed by incremental additions thereof, the initial and subsequent additions being regulated so as to provide a hydroxylamine concentration between about 0.07 mol and about 0.50 mol per liter of solution for the preponderant proportion of the $NH_4UF_5$ precipitation period, preferably until at least about 75% of the uranium in solution has precipitated as $NH_4UF_5$. Hydroxylamine concentrations below the concentration of about 0.07 mol per liter result in production of beta crystals; concentrations above about 0.50 mol per liter result in production of $NH_3OHUF_5$ as an impurity. This latter compound, while apparently not detrimental to the quality of the $UF_4$ pyrolysis product, is undesirable because, upon pyrolysis, it yields water which converts a portion of the uranium to $UO_2$ which upon fluorination consumes 6 fluorine atoms per molecule of $UO_2$, hence leads to excessive fluorine consumption during subsequent conversion to $UF_6$. We, therefore, prefer to maintain concentrations of hydroxylamine between about 0.07 mol per liter and about 0.50 mol per liter during precipitation of at least about 75% of the uranium. We have found, for example, that these concentrations can be maintained by addition of a total of about 1 mol to about 1.10 mol of hydroxylamine per mol of uranium in the solution, added in 4 to 6 separate approximately equal aliquots over a 15 to 20 minute reaction period in batch operation, or by one single aliquot of about 0.20 mol of hydroxylamine per mol of uranium in the charge, followed by continuous or intermittent addition of hydroxylamine at a rate approximately equal to the rate of depletion of hydroxylamine.

Ideally, the concentration of hydroxylamine should be maintained above the critical 0.07 mol concentration value for the entire reaction period, in order to produce a completely alpha crystalline product, and consequently, a final product of maximum purity. Such a procedure, however, is wasteful not only of hydroxylamine, but also of uranium, since it requires discontinuance of the reaction before depletion of the hydroxylamine and before complete reaction of uranium prior to the end of the precipitation period. We have found that crystalline ammonium uranous pentafluoride of adequately high purities (e.g. 99% and above) for use in the production of fluid bed $UF_4$ can be produced when the critical concentration of hydroxylamine is maintained until at least about 75% of the total precipitation is complete. The period outside the specified limits can include not only the terminal portion of the reactions, during which the final portions of $NH_3OH^+$ are reacting but also momentary dropping of the concentration below the critical level during the earlier portions of the reaction which apparently do little or no harm if not unduly prolonged.

The ammonium ion required for the reaction may be introduced in the form of any soluble ammonium salt, such as ammonium sulfate, either fresh or as contained in the recycled "barren" liquor obtained after separation of the ammonium uranous pentafluoride, or in the form of $NH_4F$, as such, or as recovered from the subsequent pyrolysis of $NH_4UF_5$ to $UF_4+NH_4F$. Other suitable ammonium salts include ammonium chloride and bisulfate. Mixtures of ammonium salts may also be used. However, ammonium nitrate $NH_4(NO_3)$ should preferably be avoided, except in small proportions, since this salt tends to consume hydroxylamine due to its oxidizing properties.

Temperature of the the reaction is not unduly critical, and does not appear to influence the crystal form of the product. Reaction proceeds slowly at temperatures of 85° C. or lower. However, higher temperatures result in higher reaction rates, so that the preferred temperatures, after mixture of all the reactants, range between about 95° C. and about 105° C. at atmospheric pressures. Within these temperature ranges, precipitation of the $NH_4UF_5$ is usually complete in not more than about 30 minutes, usually in between about 5 minutes and about 25 minutes.

Cupric ions can be added in the form of any water soluble cupric salt, for example copper sulfate, copper chloride, etc.

The process of our invention can be carried out in batchwise or continuous fashion. In either procedure, part or all of the filtrate obtained after separation of the $NH_4UF_5$ can be recycled, thus conserving the copper and chlorine values added initially and also reducing loss of uranium. Such recycling can be continued until such time as troublesome build-up of impurities occurs, when the entire filtrate can be discarded, or, more desirably, portions of the filtrate may be bled off and discarded.

The following specific examples further illustrate our invention. Parts are by weight except as otherwise noted.

EXAMPLE 1

100 grams of an ore concentrate consisting essentially of uranium oxides, primarily $UO_3$, together with small amounts of associated impurities including 3,000 parts Na, 200 parts K, 40 parts V, and 300 parts Mo per million parts uranium, and containing 78.5% U (equivalent to 78.5 grams or 0.33 mol of uranium as metal) was slurried with 250 ml. of water in a one liter corrosion resistant ("Karbate") vessel. Into this slurry there was fed with stirring 60 ml. (67 grams) of aqueous 48% HF, corresponding to 4.9 mols of HF per mol of uranium in the ore. Stirring was continued for about 10 minutes until the ore concentrate was essentially completely dissolved, thus forming a uranyl salt solution containing principally $UO_2F_2$ with excess dissolved HF, together with all the impurities in the proportions listed above.

To the above solution was added 4 grams of $CuSO_4.5H_2O$ followed by 5 ml. of 37% HCl, producing a solution containing about 3 grams Cu per liter with an HCl/Cu molar ratio of about 4. Then 12 grams of ammonium fluoride, correspondingly to about 1 mol $NH_4F$ per mol of uranium was added to the solution.

The mixture thus produced was then heated to 100° C. and to it was added in increments, as described below, a total of 225 ml. (equals 270 grams) of an aqueous solution of mixed hydroxylamine bisulfate, ammonium sulfate and ammonium bisulfate composed of about 17.0% by weight of hydroxylamine bisulafte $NH_3OH \cdot HSO_4$ and 18.0% by weight of ammonium sulfate $(NH_4)_2SO_4$, equivalent to 12 grams, or 0.35 mol of $NH_3OH^+$ (1.06 mols of $NH_3OH$ per mol of uranium in the solution). The hydroxylamine solution had been preheated to 100° C. and was added in four separate increments of 100, 65, 40 and 20 ml. at 3.5 minute intervals, which provided a concentration of at least about 0.07 mol per liter of $NH_3OH^+$ in the solution during the precipitation of 86.5% of the uranium as shown in detail in Table I below. Reaction occurred rapidly from the first addition, causing precipitation of crystalline $NH_4UF_5$ and a consequent depletion in hydroxylamine concentration in accordance with the reaction:

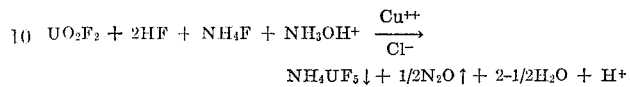

$$UO_2F_2 + 2HF + NH_4F + NH_3OH^+ \xrightarrow[Cl^-]{Cu^{++}}$$
$$NH_4UF_5 \downarrow + 1/2N_2O \uparrow + 2\text{-}1/2H_2O + H^+$$

The first addition of 100 ml. of hydroxylamine solution produced an initial concentration of $NH_3OH^+$ about 0.34 mol/liter which decreased during the 3.5 minute period before the next addition to about 0.09 mol/liter. On the second addition (65 ml.) the concentration of $NH_3OH^+$ rose momentarily to 0.28 mol/liter and decreased again to about 0.08 mol/liter in the next 3.5 minutes. On the third addition (40 ml.), the concentration of $NH_3OH^+$ rose momentarily to 0.19 mol/liter, falling again to about 0.08 mol/liter in 3.5 minutes. The final addition of 20 ml. brought the concentration of $NH_3OH^+$ momentarily to 0.13 mol/liter, which gradually decreased to essentially zero in the next 5–10 minutes. The progress of the reaction is illustrated in Table I below.

TABLE I

| Addition | Mols $NH_3OH^+$ per mole U | Time in minutes | $NH_3OH^+$ concentration, mols/liter | Percent conversion to $NH_4UF_5$ at end of period |
|---|---|---|---|---|
| 1st | 0.472 | 3.2–3.5 | .34–.09 | 34.3 |
| 2nd | 0.306 | 3.5–7.0 | .28–.08 | 63.5 |
| 3rd | 0.188 | 7.0–10.5 | .19–.08 | 84.0 |
| 4th | 0.094 | 10.5–11.2 | .13–.10 | 86.5 |
| Total mols | 1.06 | 11.2–16.0 | .100–00 | 100.0 |

The resulting green crystalline precipitate was separated from the mother liquor by filtration, yielding a "barren" liquor containing 80 parts per million of uranium expressed as the metal. This corresponds to a yield of about 99.95% of the uranium in the ore concentrate. The crystalline $NH_4UF_5$ product was dried at 120° C. and analyzed. Spectrographic analysis indicated a purity of 99.8% with separation from the elements Na, K, V, Mo initially present in the ore concentrate, as follows:

TABLE II

| | Concentration in parts per million parts U | |
|---|---|---|
| Impurity | Ore concentrate | $NH_4UF_5$ product |
| Na | 3,000 | 300 |
| K | 200 | 80 |
| V | 40 | 4 |
| Mo | 300 | 10 |

Analysis of the $NH_4UF_5$ by X-ray diffraction indicated that its crystalline form was substantially the alpha structure since its pattern showed strong diffraction peaks at the d values 8.4, 3.49, 3.03 and 2.13 angstrom units characteristic of alpha $NH_4UF_5$ with only weak peaks at the d values 6.97, 4.01, 3.48, 3.24 and 2.02 angstrom units characteristic of the beta form. Also absent were diffraction peaks at the d values 7.68, 3.19, 2.42, 2.22, 2.11, 2.07 and 2.00 angstrom units characteristic of the compound $NH_3OHUF_5$.

EXAMPLE 2

606 grams of a composite ore concentrate, of the same general character as that described in Example 1, containing 74.9% U (equivalent to 454 grams, or 1.91 mols of uranium as metal) were slurried with 1.4 liters of water in a one-gallon vessel. Into this slurry there was fed with stirring 392 grams of aqueous 48% hydrofluoric acid, corresponding to 4.9 mols of HF per mol of uranium in the ore. Stirring was continued for about 10 minutes until the core concentrate was essentially completely dissolved, thus forming about 1.7 liters of a uranyl salt solution containing principally $UO_2F_2$ with excess dissolved HF, along with smaller amounts of impurities associated with the uranium in the ore concentrate.

To the above solution was added 19 grams of $$CuSO_4 \cdot 5H_2O$$

followed by 33 ml. of 37% HCl, producing a solution containing about 3 grams of Cu per liter with an HCl/Cu molar ratio about 5. Then 70 grams of ammonium fluoride, corresponding to one mol $NH_4F$ per mol of uranium was added to the solution.

The mixture thus produced was then heated to 100° C. and to it was added in increments, a total of 500 ml. of a liquor containing 25.1% $(NH_3OH)_2SO_4$ and 26.8% $(NH_4)_2SO_4$ by weight, equivalent to 70 grams, or 2.06 mols of $NH_3OH^+$ (i.e. 1.08 mols $NH_3OH^+$ per mol of uranium). The liquor had been preheated to 100° C. and was added in five separate increments, i.e. in five 100 ml. portions added initially and every 3 minutes thereafter until the total charge of 500 ml. had been added. Reaction occurred rapidly from the first addition, causing precipitation of crystalline $NH_4UF_5$ and a consequent depletion in hydroxylamine concentration.

The first addition of 100 ml. of the hydroxylamine liquor produced an initial concentration of approximately 0.23 mol/liter $NH_3OH^+$ while the subsequent additions produced somewhat smaller momentary increases in $NH_3OH^+$ concentration due to dilution by the hydroxylamine liquor itself, so that on the fifth and final addition, the momentary increase amounted to about 0.18 mol/liter. During each 3 minute period, the $NH_3OH^+$ concentration then decreased to a fraction of the concentration present at the beginning of these periods, the fraction depleted decreasing in accordance with the changing kinetics of the reaction shown above, which varies in proportion to the $UO_2F_2$ concentration.

The approximate $NH_3OH^+$ concentration during the 5 additions of liquor are as follows:

TABLE III

| Addition | Mols $NH_3OH^+$ per mol U added | Time in minutes | Hydroxylamine concentration, mols/liter | Percent conversion to $NH_4UF_5$ at end of period |
|---|---|---|---|---|
| 1st | .216 | 0–3 | 0.23–0.06 | 18.0 |
| 2nd | .216 | 3–6.0 | 0.28–0.08 | 35.0 |
| 3rd | .216 | 6.0–9.0 | 0.29–0.11 | 53.0 |
| 4th | .216 | 9.0–12.0 | 0.31–0.15 | 70.0 |
| 5th | .216 | 12.0–0–15 | 0.34–0.18 | 85.0 |
|  |  | 15–16.7 | 0.18–0.10 | 92.0 |
|  |  | 16.7–.20 | 0.10–00 | 99.8 |

It will be apparent from the Table III above that of the total of nearly 100% conversion, over 90% was achieved while the hydroxylamine concentration was above 0.07 mol per liter, less than 10% of the conversion taking place at concentrations below 0.07 mol per liter, at the end of the reaction.

The resulting green crystalline precipitate was separated from the mother liquor by filtration, yielding a "barren" liquor containing about 50 parts per million of uranium expressed as the metal. This corresponds to a yield of 99.98% of the uranium in the ore concentrate. The crystalline $NH_4UF_5$ product was dried at 120° C. (weight obtained 667 grams=1.90 mols) and analyzed. Spectrographic analysis indicated a purity of 99.8% with separation from the elements Na, K and other elements which were present in the ore concentrate and final product respectively as follows:

TABLE IV

| Impurity | Impurity in ore composite parts per million parts U | Impurity in $NH_4UF_5$ product parts per million parts U |
|---|---|---|
| Na | 5,000 | 400 |
| K | 1,000 | 100 |
| Fe | 1,000 | 300 |
| Mn | 800 | [1] ND |
| Si | 300 | 40 |
| Cu | 50 | 80 |
| Ni | 50 | [1] ND |
| Ca | 400 | 40 |
| Cr | 70 | [1] ND |
| B | 20 | [1] ND |
| Ti | 200 | 3 |
| V | 2,000 | 20 |
| Mo | 500 | 6 |

[1] ND = Not Detectable.

It is apparent from the above Table IV that the $NH_4UF_5$ as crystallized in alpha form is extremely low in impurities and that a high degree of exclusion of the impurities present in the original material, takes place upon conversion of the uranyl salt to alpha ammonium uranous pentafluoride.

Analysis of the $NH_4UF_5$ by X-ray diffraction indicated that its crystalline form was substantially the alpha structure since its pattern showed strong diffraction peaks at the $d$ values 8.4, 3.49, 3.03 and 2.13 angstrom units characteristic of alpha-$NH_4UF_5$, with only weak peaks at the $d$ values 6.97, 4.01, 3.48, 3.24 and 2.02 angstrom units characteristic of the beta form. Also absent were diffraction peaks at the $d$ values 7.68, 3.19, 2.42, 2.22, 2.11, 2.07 and 2.00 characteristic of the compound $NH_3OHUF_5$.

EXAMPLE 3

100 grams of a uranium ore concentrate of the same general character described in Example 1 containing 73.8% U (equivalent to 73.8 grams or 0.31 mol of uranium as metal) was slurried with 200 ml. of water in a one liter corrosion resistant "Karbate" (impregnated graphite) vessel. Into this slurry there was fed with stirring, 55 ml. (equals 62 grams) of aqueous 48% HF, containing 29.8 grams of HF corresponding to 4.8 mols of HF per mol of uranium in the ore. Stirring was contined for about 10 minutes until the ore concentrate was essentially completely dissolved thus producing a uranyl salt solution containing principally $UO_2F_2$ with excess dissolved HF, together with smaller amounts of impurities associated with the uranium in the ore concentrate.

To the above solution was added 3 grams of copper sulfate pentahydrate $CuSO_4 \cdot 5H_2O$ followed by 4 ml. of 37% HCl, producing a solution containing about 2.5 grams Cu per liter with an HCl/Cu molar ratio about 4. Then 12 grams of ammonium fluoride corresponding to 1 mol $NH_4F$ per mol of uranium was added to the solution.

The mixture thus produced was then heated to 100° C., after which a total of 23 grams of acetoxime, $(CH_3)_2CNOH$, equivalent to 10.5 grams, 0.31 mol of hydroxylamine (i.e. 1.00 mol hydroxylamine per mol of uranium) was added in separate increments regulated in weight and frequency of addition to maintain a concentration of at least about 0.07 mol of $NH_3OH^+$ per liter in the solution until about 91% of the uranium in the solution had been converted to $NH_4UF_5$. Specifically, the acetoxime was added in 8 increments of approximately 3 gram portions each, every 2 minutes until the total charge of 23 grams had been added. Reaction occurred rapidly from the first addition of acetoxime, causing precipitation of crystalline $NH_4UF_5$ and a consequent depletion in hydroxylamine concentration.

Thus the initial addition of 3 grams of axetoxime caused a momentary concentration of about 0.15 mol per liter hydroxylamine and each successive addition increased the hydroxylamine concentration by approximately 0.15 mol./liter. Concentration then became depleted in each 2 minute period to a fraction of the concentration present at the beginning of the periods, the fraction depleted decreasing in accordance with the changing kinetics of reaction (1) which varies in proportion to the $UO_2F_2$ concentration. The approximate $NH_3OH^+$ concentrations during the 8 additions of acetoxime are shown in Table V as follows:

TABLE V

| Addition | Time in minutes | Mols $NH_3OH^+$ per mol U | Hydroxylamine concentration, mols/liter | Percent conversion to $NH_4UF_5$ at end of period |
|---|---|---|---|---|
| 1st | 0-2 | .1305 | 0.15-0.05 | 10.00 |
| 2nd | 2-4 | .1305 | 0.20-0.07 | 20.5 |
| 3rd | 4-6 | .1305 | 0.22-0.09 | 33.6 |
| 4th | 6-8 | .1305 | 0.24-0.11 | 42.0 |
| 5th | 8-10 | .1305 | 0.26-0.13 | 52.4 |
| 6th | 10-12 | .1305 | 0.28-0.15 | 63.5 |
| 7th | 12-14 | .1305 | 0.30-0.18 | 73.3 |
| 8th | { 14-16.8  16.8 } | .0865 | { 0.28-0.10  0.10-00 } | 87.2  100.0 |

The resulting green crystalline precipitate was separated from the mother liquor by filtration, yielding a "barren" liquor containing 50 parts per million of uranium expressed as the metal. This corresponds to a yield of 99.98% of the uranium in the ore concentrate. The crystalline $NH_4UF_5$ product was dried at 120° C. and analyzed. Spectrographic analysis indicated a purity of 99.8% with considerable separation from elements present as impurities including Na, K, V, and Mo as shown in Table VI below, listing the concentrations of these elements present in the ore concentrate and in the final product respectively.

TABLE VI

| | Concentration in parts per million parts U | |
|---|---|---|
| Impurity | Ore concentrate | $NH_4UF_5$ product |
| Na | 24,000 | 1,500 |
| K | 700 | 100 |
| V | 500 | 40 |
| Mo | 20 | 4 |

Analysis of the $NH_4UF_5$ by X-ray diffraction indicated that its crystalline form was substantially the alpha structure since its pattern showed strong diffraction peaks at the $d$ values 8.4, 3.49, 3.03 and 2.13 angstrom units characteristic of alpha-$NH_4UF_5$, with only weak peaks at the $d$ values 6.97, 4.01, 3.48, and 3.24 and 2.02 angstrom units charatceristic of the beta form. Also absent were diffraction peaks at the $d$ values 7.68, 3.19, 2.42, 2.22, 2.11, 2.07 and 2.00 characteristic of the compound $NH_3OHUF_5$.

EXAMPLE 4

Two 100 gram portions of high sodium uranium oxide are concentrate containing 66.5% U and 3.0% Na, (30,000 parts per million parts U), along with other smaller amounts of impurities including .3% K (3,000 p.p.m.) were separately slurried in water and an excess of HF in the proportions indicated in previous Examples 1–3. To the resulting essentially clear solutions, containing principally $UO_2F_2$ with excess dissolved HF, were added 4 grams $CuSO_4 \cdot 5H_2O$, 5 ml. of 37% HCl and 12 grams of $NH_4F$.

To each of the thus formed two identical solutions was added an aqueous solution of hydroxylamine and ammonium sulfate and bisulfate of the same character as that described in Example 1, but in different manners as follows:

(A) To the first solution, 500 ml. of the hydroxylamine solution was added at once in a single charge (corresponding to about 2.20 mols $NH_3OH^+$ per mol of uranium) then the mixture was heated to 100° C. and maintained at that temperature for a total of 20 minutes, during which time the hydroxylamine concentration was always substantially in excess of 0.07 mol per liter, ranging from 0.90 mol per liter immediately after addition of the single charge to 0.17 mol after 8.5 minutes, at which time virtually all the uranium in the solution had been converted to $NH_4UF_5$.

(B) To the second solution a total of 250 ml. of the hydroxylamine solution (corresponding to about 1.05 mol of $NH_3OH^+$ per mol of uranium) was added to the mixture at 100° C., as a continuous stream with a flow rate of about 12.5 ml. per minute, over a period of 20 minutes, while maintaining the temperature of the reaction mixture at 100° C., at the end of which period virtually all the uranium in the solution had been converted to $NH_4UF_5$. During the entire period, the concentration of hydroxylamine in the solution was always substantially less than 0.07 mol per liter, ranging from less than about 0.01 mol per liter to about 0.27 mol per liter.

The progress of the reactions are set forth in Tables VII-A and VII-B below.

TABLE VII-A

| Addition | Time in minutes | Mols $NH_3OH^+$ per mol U added | $NH_3OH^+$ concentration, mols/ liter | Percent conversion to $NH_4UF_5$ at end of period |
|---|---|---|---|---|
| Single | 0 | 2.20 | .0-0.9 | |
| | 1-2 | 0 | .9-.75 | 27 |
| | 2-3 | 0 | .75-.61 | 49 |
| | 3-4 | 0 | .61-.49 | 67 |
| | 4-5 | 0 | .49-.39 | 80 |
| | 5-6 | 0 | .39-.31 | 90 |
| | 6-7 | 0 | .31-.25 | 95 |
| | 7-8.5 | 0 | .25-.17 | 99.95+ |
| Total $NH_3OH^+$ | | 2.20 | | |

TABLE VII-B

| Addition | Time in minutes | Mols $NH_3OH^+$ per mol U added | $NH_3OH^+$ concentration, mols/ liter | Percent conversion to $NH_4UF_5$ at end of period |
|---|---|---|---|---|
| Continuous at uniform rate of 0.0575 mol per minute | 0-1 | 0.0575 | <0.01 | 5.4 |
| | 1-3 | 0.1150 | <0.01 | 22.2 |
| | 3-5 | 0.1150 | <0.01 | 28.0 |
| | 5-7 | 0.1150 | <0.01 | 38.5 |
| | 7-10 | 0.1725 | <0.01-.01 | 54.0 |
| | 10-15 | 0.2875 | 0.01-.015 | 77.5 |
| | 15-18 | 0.1725 | 0.015-.020 | 91.5 |
| | 18-20 | 0.1150 | 0.020-.027 | 99.95+ |
| Total $NH_3OH^+$ | | 1.150 | | |

The resulting green crystalline precipitates were separated from their respective mother liquors by filtration, yielding "barren" liquors which, in both cases contained 50 p.p.m. or less of uranium (as U), corresponding to yields of greater than 99.95% of the uranium in the ore concentrate. The products in both cases were similar in physical appearance and ease of filtration.

The crystalline $NH_4UF_5$ products were dried at 120° C. and analyzed.

X-ray diffraction analyses indicated considerable differences in crystal form as follows:

X-ray diffraction analysis

Product (A) consisted in major proportion of alpha-$NH_4UF_5$ with substantial amounts of $NH_3OHUF_5$ (20 to 40%) as indicated by strong diffraction peaks at the $d$ values 8.4, 2.49, 3.03 and 2.13 angstrom units characteristic of alpha-$NH_4UF_5$, with somewhat weaker peaks at $d$ values 7.68, 3.19, 2.42, 2.22, 2.11, 2.07 and 2.00 angstrom units characteristic of the compound $NH_3OHUF_5$ No evidence of peaks at $d$ values of 6.97, 4.01, 3.48, 3.24 and 2.02 angstrom units characteristics of beta $NH_4UF_5$ were observed, indicating substantially complete absence of beta-$NH_4UF_5$.

Product (B) consisted preponderantly of beta-$NH_4UF_5$ as indicated by strong diffraction peaks at $d$ values of 6.97, 4.01, 3.48, 3.24 and 2.02 angstrom units characteristic of beta-$NH_4UF_5$ with very weak peaks at $d$ values of 8.4, 3.49, 3.03 and 2.13 angstrom units characteristic of alpha-$NH_4UF_5$ and no evidence of the peaks recited above characteristic of the compound $NH_3OHUF_5$.

Spectrographic analyses indicated the wide difference in sodium and potassium elimination obtained in the alpha and beta crystals respectively as shown in Table VIII below.

TABLE VIII

| Impurity | Concentration in parts per million parts U | | |
|---|---|---|---|
| | Original ore concentrate | Alpha-$NH_4UF_5$ product (A) | Beta-$NH_4UF_5$ product (B) |
| Na | 30,000 | 800 | 9,000 |
| K | 300 | 200 | 2,000 |

It is apparent from the Table VIII above that the beta crystalline form of ammonium uranous fluoride retains significantly larger proportions of impurities originally present in the ore and uranyl salt solution than does the alpha crystalline form. It is also apparent that our process is effective to produce alpha-$NH_4UF_5$ of sufficiently low sodium and potassium impurities for the production of fluid bed $UF_4$, even from extremely highly contaminated uranium ores and uranyl salt solutions and that when the beta salt is produced from the same ore and uranyl salt solution, it is too highly contaminated with sodium and potassium impurities for use in the production of acceptable fluid bed $UF_4$ from such contaminated starting materials.

EXAMPLE 5

100 grams of an ore concentrate containing 78.5% U (equals 78.5 grams of 0.33 mol of uranium as metal) was treated with water, 48% HF, $CuSO_4 \cdot 5H_2O$, 37% HCl and $NH_4F$ in the same proportions as described in Example 1.

The mixture was heated to 100° C. and then 84 ml. of a liquor containing 25.1% $(NH_3OH)_2SO_4$ and 26.8% $(NH_4)_2SO_4$ by weight equivalent to 11.4 grams, 0.383 mol of $NH_3OH^+$, i.e. 1.16 mol of $NH_3OH^+$ per mol of uranium in the charge, was added in the following manner:

Stage 1: 21 ml. of liquor (containing 2.85 grams or 0.0865 mol $NH_3OH^+$) was added all at once thus providing an initial concentration of 0.227 mol/liter of $NH_3OH^+$ in the solution, which was depleted in 2.5 minutes to 0.080 mol/liter.

Stage 2: Immediately at the end of the 2.5 minute period of Stage 1, the remaining 63 ml. of the hydroxylamine sulfate liquor (equals 8.55 grams or 0.2965 mol of $NH_3OH^+$) was added as a continual stream from a burette at a uniformly decreasing rate calculated from the kinetic data available for this reaction system to provide a constant concentration of $NH_3OH^+$ of 0.080 mol/liter in the solution throughout a period of 22.5 minutes, i.e. from 2.5–25.0 minutes, as follows:

Time interval, minutes: Ml. $(NH_3OH)_2SO_4$ liquor added
- 1.5–5.0 _____ 10.1
- 5.0–7.5 _____ 9.3
- 7.5–10.0 _____ 8.5
- 10.0–12.5 _____ 7.7
- 12.5–15.0 _____ 6.9
- 15.0–17.5 _____ 6.3
- 17.5–20.0 _____ 5.5
- 20.0–22.5 _____ 4.7
- 22.5–25.0 _____ 4.0

63.0

At the end of Stage 2, the reaction mixture was filtered rapidly to separate the precipitated $NH_4UF_5$. The product was washed and dried at 120° C.; the amount of $NH_4UF_5$ obtained weighed 101.2 grams corresponding to recovery of 87% of the uranium in the ore concentrate.

An X-ray diffraction analysis of the product obtained indicated it to be virtually pure alpha $NH_4UF_5$ as indicated by very strong diffraction peaks at the $d$ values 8.4, 3.49, 3.03 and 2.13 angstrom units characteristic of the alpha crystals, and no detectable peaks at any of the $d$ values 6.97, 4.01, 3.48, 3.24 or 2.02 angstrom units characteristic of the beta crystals.

Stage 3: Immediately after the separation of the precipitated $NH_4UF_5$ described above, the filtrate (which began to develop additional $NH_4UF_5$ precipitate during the course of the filtration) was reheated to 100° C. and maintained at that temperature for 10 minutes until the remaining uranium precipitated out. During this stage, the estimated $NH_3OH^+$ concentration decreased continually from 0.080 mol/liter to some value below 0.03 mol/liter.

The precipitated $NH_4UF_5$ was separated, washed and dried at 120° C.; 15.7 grams of product was obtained (corresponding to about 13% of the uranium in the ore concentrate).

An X-ray diffraction analysis of the product from Stage 3 indicated that the product was predominantly beta $NH_4UF_5$ as established by strong diffraction peaks at $d$ values of 6.97, 4.01, 3.48, 3.24 and 2.02 angstrom units characteristic of the beta form, with virtual absence of peaks at the $d$ values characteristic of the alpha form.

It is thus apparent that maintenance of the hydroxylamine concentration in the solution at a value of 0.08 mol per liter results in the precipitation of $NH_4UF_5$ substantially exclusively in its alpha crystalline form.

Table IX below provides a comparison of the elimination of impurities in the production of $NH_4UF_5$ according to our process wherein the alpha crystalline form is produced (Example 1) with the substantial retention of impurities in a process wherein the beta crystalline form is produced (Example 4B), using as starting materials ore concentrates and uranyl salt solutions initially containing various proportions of such impurities. Since, in all cases the proportions of impurities are reported in parts of impurity (as metal) per million parts of uranium (as metal), the figures shown for ore concentrates also represent the proportions of the impurities in the uranyl salt. Similarly, the proportions of impurities shown for the ammonium uranium pentafluoride product apply also to the uranium tetrafluoride ($UF_4$) ultimately produced from the $NH_4UF_5$ by pyrolysis.

TABLE IX
Products and Metallic Impurities in Parts Per Million Parts U

| Impurity | Ore concentrate and uranyl salt solution | Example 1 Alpha $NH_4UF_5$ plus trace beta $NH_4UF_5$ | Example 4B Beta $NH_4UF_5$ plus trace alpha $NH_4UF_5$ |
|---|---|---|---|
| Na | 30,000 | 2,000 | 9,000 |
| | 24,000 | 1,500 | 8,000 |
| | 5,000 | 400 | |
| | 3,000 | 300 | 100 |
| | 1,000 | | |
| K | 3,000 | 200 | 2,000 |
| | 1,000 | 100 | |
| | 700 | 100 | 200 |
| | 300 | | |
| | 200 | | |
| V | 2,000 | 20 | <80 |
| | 500 | 20 | 30 |
| | 40 | 4 | 4 |
| | 30 | | |
| Mo | 800 | 20 | 20 |
| | 500 | 6 | |
| | 70 | 10 | 9 |
| | 20 | | 2 |
| Fe | 10,000 | | 4,000 |
| | 4,000 | 2,000 | 1,000 |
| | 2,000 | | |
| Mn | 1,000 | 300 | 600 |
| | 1,000 | 100 | 100 |
| | 800 | [1] ND | 70 |
| | 200 | | |
| Si | 10,000 | <40 | <40 |
| | 5,000 | <40 | |
| | 1,000 | | <40 |
| | 300 | <40 | |
| Cr | 200 | | 70 |
| | 70 | [1] ND | |
| B | <20 | [1] ND | |
| Ti | 200 | 3 | |

[1] ND = Not Detectable.

The process of our invention enables us to produce ammonium uranous pentafluoride in very high yields and in very high purities from uranium ore concentrates of varying grades, and makes it possible to use ore concentrates or relatively high proportions of troublesome impurities including sodium, potassium, molybdenum and vanadium which could not otherwise be employed without further treatments to remove these impurities.

While the above describes the preferred embodiments of our invention, it will be understood that departures can be made therefrom within the scope of the specification and claims.

We claim:

1. The process for producing ammonium uranous pentafluoride in predominantly alpha crystalline form, which comprises adding hydrogen fluoride and hydroxylamine or a hydroxylamine-yielding compound to an aqueous acidic solution of a uranyl salt containing a catalytic quantity of a cupric salt, a source of chloride ions in an amount sufficient to provide a molar ratio of chloride ions to cupric ions of at least about 4, and an ammonium salt in amount sufficient to provide at least about 1 mol of ammonium ions per mol of uranium, while maintaining the solution at temperatures of at least about 85° C., the addition of hydroxylamine or hydroxylamine-yielding compound being regulated in amount totaling at least about one mole per mole of uranium in the solution and in time of addition so as to maintain a concentration of hydroxylamine in said aqueous acidic solution of at least about 0.07 mol per liter of solution until conversion of at least about 75% of the uranium in the solution to $NH_4UF_5$ has been effected, and recovering the resulting predominantly alpha crystalline ammonium uranous pentafluoride.

2. The process according to claim 1 wherein the total hydroxylamine or hydroxylamine-yielding compound added is between about 1.00 mol and about 1.50 mols per mol of uranium in the solution.

3. The process according to claim 1 wherein the hydroxylamine concentration is maintained at between about 0.07 mol per liter and about 0.05 mol per liter of solution.

References Cited

FOREIGN PATENTS

| | | | |
|---|---|---|---|
| 766,691 | 9/1967 | Canada | 23—346 |
| 1,038,495 | 9/1953 | France | 23—346 |
| 696,051 | 8/1953 | Great Britain | 23—346 |

CARL D. QUARFORTH, Primary Examiner

F. M. GITTES, Assistant Examiner

U.S. Cl. X.R.

23—323, 333 352